United States Patent Office 3,338,943
Patented Aug. 29, 1967

3,338,943
AMINOORGANOSILOXANE-CARBOXYORGANO-SILOXANE COPOLYMERS
John L. Speier, Midland, Mich., assignor to Dow Corning Corporation, Midland, Mich., a corporation of Michigan
No Drawing. Filed May 13, 1963, Ser. No. 280,134
20 Claims. (Cl. 260—448.2)

This invention is related to new aminoorganosiloxane-carboxyorganosiloxane copolymers.

More particularly, this invention relates to copolymers containing the siloxane units (1)
$$Z_2NRSiO_{3-a/2}$$

wherein R is a divalent hydrocarbon radical free from aliphatic unsaturation and containing at least three carbon atoms, Z is a member selected from the group consisting of hydrogen, monovalent hydrocarbon groups and amino-substituted monovalent hydrocarbon groups free from aliphatic unsaturation, R' is a member selected from the group consisting of monovalent hydrocarbon groups free from aliphatic unsaturation and fluorinated monovalent hydrocarbon groups free from aliphatic unsaturation and in which all of the fluorine atoms are attached to at least the third carbon atom removed from the silicon atom, $a$ is an integer from 0 to 2 inclusive, the $Z_2N$— group is attached to at least the third carbon atom removed from the silicon atom, and (2)
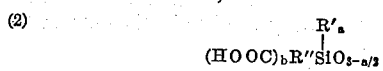
$$(HOOC)_bR''SiO_{3-a/2}$$

wherein R" is a member selected from the group consisting of divalent and trivalent saturated aliphatic and cycloaliphatic hydrocarbon radicals containing at least two carbon atoms, $b$ is an integer from 1 to 2 inclusive and R' and $a$ have the above defined meanings.

The relative numbers of the units (1) and (2) that are present in the copolymers of this invention must be such that there is at least .5 amino nitrogen atom for each carboxyl group and preferably at least one amino nitrogen atom for each carboxyl group.

In addition to the above siloxane units, the copolymers of this invention can also contain siloxane units of the general formula (3)
$$R'_cSiO_{4-c/2}$$

wherein R' has the above defined meaning and $c$ is an integer from 0 to 3 inclusive.

The copolymers of this invention have many uses. For example, they can be applied to the surfaces of metals, glass, etc. to form a protective coating thereon. The water soluble copolymers of this invention can also be used to treat paper pulp which can then be used to make paper having increased wet strength. Such paper is particularly useful for making military maps, charts, etc. The copolymers can further be employed as additives for polyurethane foams to control cell size.

The siloxane units (1), (2) and (3) employed in making copolymers of this invention are well known materials and can be prepared by processes well known to those skilled in the art. For example, the aminoorganosiloxanes are disclosed in U.S. Patent 3,033,815 and the carboxy organosiloxanes are disclosed in U.S. Patent 2,723,987. The disclosure of these patents is incorporated herein by reference. It is understood that various end-blocking groups are present in the copolymers of this invention, but their exact nature is not important so long as they contain no group that would adversely affect the amino and carboxyl groups in the copolymer.

By way of illustration, in the above formulae R can be any divalent hydrocarbon radical free of aliphatic unsaturation such as —CH$_2$CH$_2$CH$_2$—,

—CH$_2$CH$_2$CH$_2$CH$_2$—

—CH$_2$CH$_2$CH$_2$CH$_2$CH$_2$—, —C$_6$H$_4$—, —C$_6$H$_{10}$—, cyclopentylene, methylcyclohexylene, —C$_{18}$H$_{36}$—,

—CH$_2$CH(CH$_3$)CH$_2$— or —CH$_2$CH$_2$CH(CH$_3$)CH$_2$—, Z can be (in addition to hydrogen) any monovalent hydrocarbon group such as an alkyl group such as a methyl, ethyl, propyl, butyl, pentyl, octyl, decyl, dodecyl, octadecyl, isopropyl or an isobutyl group, a cycloalkyl group such as a cyclohexyl or a cyclopentyl group, an aryl group such as a phenyl, tolyl, benzyl naphthyl or a xenyl group; any amino-substituted hydrocarbon group such as a H$_2$NCH$_2$CH$_2$—, H$_2$NCH$_2$CH$_2$CH$_2$—, H$_2$NCH$_2$CH$_2$CH$_2$CH$_2$CH$_2$CH$_2$—, (C$_3$H$_7$)HNCH$_2$CH$_2$—, (C$_2$H$_5$)HNCH$_2$CH$_2$CH$_2$—,

H$_2$NC$_6$H$_4$— or an aminotolyl group; R' can be any monovalent hydrocarbon group free of aliphatic unsaturation such as those disclosed for Z above or R' can be a CF$_3$CH$_2$CH$_2$—, CF$_3$CF$_2$CH$_2$CH$_2$—, C$_7$H$_{15}$CH$_2$CH$_2$—, CF$_3$C$_6$H$_4$—, (CF$_3$)$_2$CFCH$_2$CH$_2$— or a (CF$_3$)$_2$CHCH$_2$CH$_2$— group and R" can be any divalent or trivalent saturated aliphatic hydrocarbon group such as —CH$_2$CH$_2$—, —CH$_2$CH$_2$CH$_2$—, —CH$_2$CH$_2$CH$_2$CH$_2$—, —C$_{18}$H$_{36}$—,

—CH$_2$CH(CH$_3$)CH$_2$—

—CH$_2$CH$_2$CH(CH$_3$)CH$_2$—,

or a

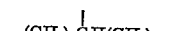

group, any cyclic divalent aliphatic hydrocarbon group of at least 5 carbon atoms such as a cyclohexylene, cyclopentylene, methylcyclohexylene or

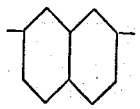

group, any trivalent cycloaliphatic hydrocarbon group of at least 6 carbon atoms such as a

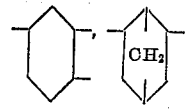

or a

group.

The copolymers of this invention are prepared by first forming a solution of a hydrolyzable aminoorganosilane in water, then a previously prepared carboxyorganosiloxane and/or a copolymer of the carboxyorganosiloxane and siloxane (3) is added to the solution and the mixture stirred and heated slightly (i.e., between about 50–100° C.) until a homogeneous solution is obtained. The copolymers of this invention are believed to be formed by the rearrangement of the siloxane bonds.

In order that those skilled in the art may better understand how the present invention can be practiced, the following examples are given by way of illustration and not by way of limitation.

*Example 1*

A solution of 4.76 g. of $$H_2NCH_2CH_2NH(CH_2)_3Si(OCH_3)_3$$

in 10.6 m. of water was prepared, the former being added to the water with stirring. Then 5.84 g. of a sticky semi-solid siloxane composed of $$\underset{\underset{HOOCH(CH_3)CH_2SiO}{|}}{CH_3}$$

units and having a neutral equivalent of 147.7 was added and the mixture heated to 60° C. with stirring until a homogeneous solution resulted. The product was a water soluble copolymer of $H_2NCH_2CH_2NH(CH_2)_3SiO_{3/2}$ and $$\underset{\underset{HOOCH(CH_3)CH_2SiO}{|}}{CH_3}$$

units and containing about one amino nitrogen atom per carboxyl group.

*Example 2*

A solution of 5 g. of $$H_2NCH_2CH_2NH(CH_2)_3Si(OCH_3)_3$$

in 15 ml. of water was prepared. To this solution 5 g. of a copolymer of $(CH_3)_2SiO$ units (about 45 mol percent) and $$\underset{\underset{HOOCH(CH_3)CH_2SiO}{|}}{CH_3}$$

units (about 55 mol percent) was added with agitation until a homogeneous solution was obtained. The product was a water soluble copolymer of $$H_2NCH_2CH_2NH(CH_2)_3SiO_{3/2}$$

$$\underset{\underset{HOOCH(CH_3)CH_2SiO}{|}}{CH_3}$$

and $(CH_3)_2SiO$ units and containing about 2 amino nitrogen atoms per carboxyl group.

A film of this material was cast on a glass slide and heated to 140° C. The result was a clear protective film.

*Example 3*

A solution of 357 g. of $$H_2NCH_2CH_2NH(CH_2)_3Si(OCH_3)_3$$

in 576 ml. of water was prepared. To this solution 219 g. of a sticky semi-solid siloxane composed of $$\underset{\underset{HOOCH(CH_3)CH_2SiO}{|}}{CH_3}$$

units was added. The mixture was stirred and heated to 76° C. until a homogeneous solution resulted. The product was a water soluble copolymer of $$H_2NCH_2CH_2NH(CH_2)_3SiO_{3/2}$$

and $$\underset{\underset{HOOCH(CH_3)CH_2SiO}{|}}{CH_3}$$

units and containing about 2 amino nitrogen atoms per carboxyl group.

*Example 4*

610 ml. of water was added to a flask. To this 273.7 g. of $H_2NCH_2CH_2NH(CH_2)_3Si(OCH_3)_3$ was added slowly with stirring. Then 335.8 g. of a sticky semi-solid siloxane composed of $$\underset{\underset{HOOCH(CH_3)CH_2SiO}{|}}{CH_3}$$

units was added. The mixture was then stirred and heated to 84° C. until a homogeneous solution was obtained. The product was a water soluble copolymer of $$H_2NCH_2CH_2NH(CH_2)_3SiO_{3/2}$$

and $$\underset{\underset{HOOCH(CH_3)CH_2SiO}{|}}{CH_3}$$

units and containing about one amino nitrogen atom for each carboxyl group.

*Example 5*

A solution of 4.9 g. of $$H_2NCH_2CH_2NH(CH_2)_3Si(OCH_3)_3$$

in 10 ml. of water was prepared. This solution was then heated to 60° C. and a sticky semi-solid siloxane composed of $$\underset{\underset{HOOCH(CH_3)CH_2SiO}{|}}{CH_3}$$

units was added a little at a time with stirring until a total of 7.5 g. had been added. The product was a copolymer of $H_2NCH_2CH_2NH(CH_2)_3SiO_{3/2}$ and $$\underset{\underset{HOOCH(CH_3)CH_2SiO}{|}}{CH_3}$$

units and containing about .8 amino nitrogen atom per carboxyl group.

*Example 6*

When the following aminoorganoalkoxysilanes and carboxyorganosiloxanes are substituted in equivalent amounts for the materials employed in Examples 3 or 4, the siloxane copolymers containing the units indicated in the table below are obtained.

| Amino Compound | Carboxy Compound or Copolymer | Siloxane Copolymer Units |
|---|---|---|
| $H_2N(CH_2)_2NH(CH_2)_3Si(OCH_3)_3$ | $\underset{\underset{HOOCH(CH_3)CH_2SiO}{\|}}{CH_3}$ | $NH_2(CH_2)_2NH(CH_2)_3SiO_{3/2}$ <br> $\underset{\underset{HOOCH(CH_3)CH_2SiO}{\|}}{CH_3}$ |
| $H_2N(CH_2)_3Si(OC_2H_5)_3$ | $HOOC(CH_2)_2SiO_{3/2}$ | $H_2N(CH_2)_3SiO_{3/2}$ <br> $HOOC(CH_2)_2SiO_{3/2}$ |
| $\underset{\underset{H_2N(CH_2)_3Si(OC_2H_5)_2}{\|}}{C_2H_5}$ | $\underset{\underset{HOOC(CH_2)_3SiO}{\|}}{CH_3}$ | $\underset{\underset{H_2N(CH_2)_3SiO}{\|}}{C_2H_5}$ <br> $\underset{\underset{HOOC(CH_2)_3SiO}{\|}}{CH_3}$ |

| Amino Compound | Carboxy Compound or Copolymer | Siloxane Copolymer Units |
|---|---|---|
| $H_2N(CH_2)_2NH(CH_2)_3Si(OCH_3)_2$ with $CH_3$ | $HOOCH_{20}C_{10}SiO$ with $C_6H_4CH_3$ <br> $CH_3(C_6H_5)SiO$ | $H_2N(CH_2)_2NH(CH_2)_3SiO$ with $CH_3$ <br> $HOOCH_{20}C_{10}SiO$ with $C_6H_4CH_3$ <br> $CH_3(C_6H_5)SiO$ |
| $H_2NCH(CH_3)CH_2NH(CH_2)_3Si(OCH_3)_2$ with $C_6H_5$ | $HOOCH_{34}C_{17}SiO$ with $C_6H_5$ | $H_2NCH(CH_3)CH_2NH(CH_2)_3SiO$ with $C_6H_5$ <br> $HOOCH_{34}C_{17}SiO$ with $C_6H_5$ |
| $H_2N(CH_2)_2NH(CH_2)_3SiOCH_3$ with $(CH_3)_2$ | $HOOC-\langle\text{cyclohexyl-}CH_2\rangle-SiO$ with $CH_3$ | $H_2N(CH_2)_2NH(CH_2)_3SiO_{1/2}$ with $(CH_3)_2$ <br> $HOOC-\langle\text{cyclohexyl-}CH_2\rangle-SiO$ with $CH_3$ |
| $(CH_3)HN(CH_2)_3Si(OCH_3)_3$ | $HOOCH_{10}C_6SiO$ with $C_6H_5$ | $(CH_3)HN(CH_2)_3SiO_{3/2}$ <br> $HOOCH_{10}C_6SiO$ with $C_6H_5$ |
| $H_2N(CH_2)_2NH(CH_2)_3Si(OCH_3)_2$ with $CH_2CH_2CF_3$ | $HOOCH_4C_6CH_2SiO_{3/2}$ <br> $(C_2H_5)_2SiO$ | $H_2N(CH_2)_2NH(CH_2)_3SiO$ with $CH_2CH_2CF_3$ <br> $HOOCH_4C_6CH_2SiO_{3/2}$ <br> $(C_2H_5)_2SiO$ |
| $(CH_3)HN(CH_2)_2NH(CH_2)_3Si(OCH_3)_3$ | $HOOC(CH_2)_2(HOOC)CH(CH_2)_2SiO$ with $C_5H_{11}$ <br> $(C_6H_5)_2SiO$ | $(CH_3)HN(CH_2)_2NH(CH_2)_3SiO_{3/2}$ <br> $HOOC(CH_2)_2(HOOC)CH(CH_2)_2SiO$ with $C_5H_{11}$ <br> $(C_6H_5)_2SiO$ |
| $(CH_3)_2N(CH_2)_3Si(OCH_3)_3$ | $HOOC(CH_2)_3SiO$ with $CH_3$ <br> $(CH_3)_2SiO$ <br> $C_6H_5SiO_{3/2}$ | $(CH_3)_2N(CH_2)_3SiO_{3/2}$ <br> $HOOC(CH_2)_3SiO$ with $CH_3$ <br> $(CH_3)_2SiO$ <br> $C_6H_5SiO_{3/2}$ |
| $H_2N(CH_2)_2NHCH_2CH(CH_3)CH_2Si(OCH_3)_3$ | $HOOC-\langle\text{cyclohexyl-}CH_2\rangle-SiO_{3/2}$ <br> $HOOC-$ <br> $CH_3(CF_3CH_2CH_2)SiO$ | $H_2N(CH_2)_2NHCH_2CH(CH_3)CH_2SiO_{3/2}$ <br> $HOOC-\langle\text{cyclohexyl-}CH_2\rangle-SiO_{3/2}$ <br> $HOOC-$ <br> $CH_3(CF_3CH_2CH_2)SiO$ |
| $H_2N(CH_2)_3Si(OCH_2CH_2OCH_3)_3$ | $HOOC(CH_2)_3SiO$ with $CH_2CH_2CF_2CF_3$ | $H_2N(CH_2)_3SiO_{3/2}$ <br> $HOOC(CH_2)_3SiO$ with $CH_2CH_2CF_2CF_3$ |
| $H_2N(CH_2)_2NH(CH_2)_3Si(OC_3H_7)_3$ | $HOOCCH(CH_3)CH_2SiO$ with $CH_3$ | $H_2N(CH_2)_2NH(CH_2)_3SiO_{3/2}$ <br> $HOOCCH(CH_3)CH_2SiO$ with $CH_3$ |
| $H_2N(CH_2CH_2NH)_4(CH_2)_3Si(OCH_3)_3$ | $HOOC(CH_2)_3SiO$ with $CH_3$ | $H_2N(CH_2CH_2NH)_4(CH_2)_3SiO_{3/2}$ <br> $HOOC(CH_2)_3SiO$ with $CH_3$ |

| Amino Compound | Carboxy Compound or Copolymer | Siloxane Copolymer Units |
|---|---|---|
| $CH_2=CHCH_2NH(CH_2)_3\overset{\underset{\displaystyle C_6H_4CF_3}{\|}}{Si}(OCH_3)_2$ | $HOOCCH_2CH_2\overset{\underset{\displaystyle C_6H_{11}}{\|}}{C}HCH_2CH_2SiO$<br>$SiO_2$<br>$(CH_3)_3SiO_{1/2}$ | $CH_2=CHCH_2NH(CH_2)_3\overset{\underset{\displaystyle C_6H_4CF_3}{\|}}{Si}O$<br>$HOOCCH_2CH_2\overset{\underset{\displaystyle C_6H_{11}}{\|}}{C}HCH_2CH_2SiO$<br>$SiO_2$<br>$(CH_3)_3SiO_{1/2}$ |
| $C_6H_5NHC_6H_4\overset{\underset{\displaystyle C_6H_4F}{\|}}{Si}(OCH_3)_2$ | $HOOC(CH_2)_3\overset{\underset{\displaystyle C_6H_{10}F}{\|}}{Si}O$ | $C_6H_5NHC_6H_4\overset{\underset{\displaystyle C_6H_5F}{\|}}{Si}O$<br>$HOOC(CH_2)_3\overset{\underset{\displaystyle C_6H_{10}F}{\|}}{Si}O$ |
| $H_2NC_6H_4NH(CH_2)_3\overset{\underset{\displaystyle CH_2C_6H_5}{\|}}{Si}(OCH_3)_2$ | $HOOC(CH_2)_4\overset{\underset{\displaystyle CH_2C_6H_4F}{\|}}{Si}O$ | $H_2NC_6H_4NH(CH_2)_3\overset{\underset{\displaystyle CH_2C_6H_5}{\|}}{Si}O$<br>$HOOC(CH_2)_4\overset{\underset{\displaystyle CH_2C_6H_4F}{\|}}{Si}O$ |
| $C_6H_{11}NHC_6H_{10}Si(OCH_3)_3$ | $HOOC(CH_2)_3SiO_{3/2}$ | $C_6H_{11}NHC_6H_{10}SiO_{3/2}$<br>$HOOC(CH_2)_3SiO_{3/2}$ |
| $C_6H_9NH(CH_2)_3\overset{\underset{\displaystyle CH_3}{\|}}{Si}(OCH_3)_2$ | $HOOC(CH_2)_5\overset{\underset{\displaystyle C_3H_7}{\|}}{Si}O$ | $C_6H_9NH(CH_2)_3\overset{\underset{\displaystyle CH_3}{\|}}{Si}O$<br>$HOOC(CH_2)_5\overset{\underset{\displaystyle C_3H_7}{\|}}{Si}O$ |
| $CH\equiv CCH_2CH_2NH(CH_2)_3Si(OCH_3)_3$ | $HOOCCH(CH_3)CH_2SiO_{3/2}$ | $CH\equiv CCH_2CH_2NH(CH_2)_3SiO_{3/2}$<br>$HOOCCH(CH_3)CH_2SiO_{3/2}$ |
| $H_2NC_6H_4CH_2NH(CH_2)_3Si(OCH_3)_3$ | $HOOC(CH_2)_3SiO_{3/2}$ | $H_2NC_6H_4CH_2NH(CH_2)_3SiO_{3/2}$<br>$HOOC(CH_2)_3SiO_{3/2}$ |
| $CH_3C_6H_4NH(CH_2)_4Si(OCH_3)_3$ | $HOOC(CH_2)_3SiO_{3/2}$ | $CH_3C_6H_4NH(CH_2)_4SiO_{3/2}$<br>$HOOC(CH_2)_3SiO_{3/2}$ |
| $C_6H_5CH_2NH(CH_2)_3Si(OCH_3)_3$<br>$H_2NC_6H_4CH_2NH(CH_2)_3Si(OCH_3)_3$ | $HOOC(CH_2)_4SiO_{3/2}$ | $C_6H_5CH_2NH(CH_2)_3SiO_{3/2}$<br>$H_2NC_6H_4CH_2NH(CH_2)_3SiO_{3/2}$<br>$HOOC(CH_2)_4SiO_{3/2}$ |
| $H_2NC_6H_{10}NH(CH_2)_3Si(OCH_3)_3$ | $HOOC(CH_2)_3\overset{\underset{\displaystyle CH_3}{\|}}{Si}O$ | $H_2NC_6H_{10}NH(CH_2)_3SiO_{3/2}$<br>$HOOC(CH_2)_3\overset{\underset{\displaystyle CH_3}{\|}}{Si}O$ |

That which is claimed is:

1. A copolymer consisting essentially of the siloxane units (1) 

wherein

R is a divalent hydrocarbon radical free from aliphatic unsaturation and containing at least 3 carbon atoms, Z is a member selected from the group consisting of hydrogen, monovalent hydrocarbon groups and amino-substituted monovalent hydrocarbon groups free from aliphatic unsaturation, R' is a member selected from the group consisting of monovalent hydrocarbon groups free from aliphatic unsaturation and fluorinated monovalent hydrocarbon groups free from aliphatic unsaturation and in which all of the fluorine atoms are attached to at least the third carbon atom removed from the silicon atom, $a$ is an integer from 0 to 2 inclusive, the $Z_2N-$ group being attached to at least the third carbon atom removed from the silicon atom and (2) 

wherein

R'' is a member selected from the group consisting of divalent and trivalent saturated aliphatic and cycloaliphatic hydrocarbon radicals containing at least two carbon atoms, $b$ is an integer from 1 to 2 inclusive and R' and $a$ have the above defined meanings, the relative number of the units (1) and (2) in the copolymer being such that there is at least .5 amino nitrogen atom for each carboxyl group.

2. The copolymer of claim 1 wherein each R' is independently selected from the group consisting of methyl, phenyl and 3,3,3-trifluoropropyl groups.

3. A copolymer consisting essentially of the siloxane units $H_2N(CH_2)_2NH(CH_2)_3SiO_{3/2}$ and

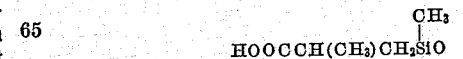

in which there is at least .5 amino nitrogen atom for each carboxyl group.

4. A copolymer consisting essentially of the siloxane units $H_2N(CH_2)_2NHCH_2CH(CH_3)CH_2SiO_{3/2}$ and

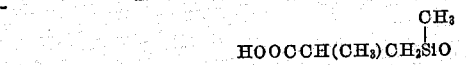

in which there is at least .5 amino nitrogen atom per carboxyl group.

5. A copolymer consisting essentially of the siloxane units $H_2N(CH_2)_3SiO_{3/2}$ and $$HOOCCH(CH_3)CH_2\underset{\underset{CH_3}{|}}{Si}O$$

in which there is at least one amino nitrogen atom per carboxyl group.

6. A copolymer consisting essentially of the siloxane units $H_2NCH_2CH_2NH(CH_2)_3SiO_{3/2}$ and $$HOOC(CH_2)_3\underset{\underset{CH_3}{|}}{Si}O$$

in which there is at least .5 amino nitrogen atom per carboxyl group.

7. A copolymer consisting essentially of the siloxane units $H_2NCH_2CH_2NHCH_2CH(CH_3)CH_2SiO_{3/2}$ and $$HOOC(CH_2)_3\underset{\underset{CH_3}{|}}{Si}O$$

in which there is at least .5 amino nitrogen atom per carboxyl group.

8. A copolymer consisting essentially of the siloxane units (1) $$Z_2NR\underset{\underset{R'_a}{|}}{Si}O_{3-a/2}$$

wherein

R is a divalent hydrocarbon radical free from aliphatic unsaturation and containing at least three carbon atoms,
Z is a member selected from the group consisting of hydrogen, monovalent hydrocarbon groups and amino-substituted monovalent hydrocarbon groups free from aliphatic unsaturation,
R' is a member selected from the group consisting of monovalent hydrocarbon groups free from aliphatic unsaturation and fluorinated monovalent hydrocarbon groups free from aliphatic unsaturation and in which all of the fluorine atoms are attached to at least the third carbon atom removed from the silicon atom,
a is an integer from 0 to 2 inclusive, the $Z_2N-$ group is attached to at least the third carbon atom removed from the silicon atom, (2) $$(HOOC)_bR''\underset{\underset{R'_a}{|}}{Si}O_{3-a/2}$$

wherein

R'' is a member selected from the group consisting of divalent and trivalent saturated aliphatic and cycloaliphatic hydrocarbon radicals containing at least two carbon atoms,
b is an integer from 1 to 2 inclusive and
R' and a have the above defined meanings, and (3) $$R'_cSiO_{4-c/2}$$

wherein

R' has the above defined meaning and
c is an integer from 0 to 3 inclusive, the relative number of the units (1) and (2) in the copolymer being such that there is at least .5 amino nitrogen atom for each carboxyl group.

9. The copolymer of claim 8 wherein each R' is independently selected from the group consisting of methyl, phenyl and 3,3,3-trifluoropropyl groups.

10. The copolymer of claim 9 wherein the siloxane unit (1) is $H_2N(CH_2)_2NH(CH_2)_3SiO_{3/2}$ and the siloxane unit (2) is $$HOOCCH(CH_3)CH_2\underset{\underset{CH_3}{|}}{Si}O$$

11. The copolymer of claim 9 wherein the siloxane unit (1) is $H_2N(CH_2)_2NHCH_2CH(CH_3)CH_2SiO_{3/2}$ and the siloxane unit (2) is $$HOOCCH(CH_3)CH_2\underset{\underset{CH_3}{|}}{Si}O$$

12. The copolymer of claim 9 wherein the siloxane unit (1) is $H_2N(CH_2)_3SiO_{3/2}$ and the siloxane unit (2) is $$HOOCCH(CH_3)CH_2\underset{\underset{CH_3}{|}}{Si}O$$

13. The copolymer of claim 9 wherein the siloxane unit (1) is $H_2NCH_2CH_2NH(CH_2)_3SiO_{3/2}$ and the siloxane unit (2) is $$HOOC(CH_2)_3\underset{\underset{CH_3}{|}}{Si}O$$

14. The copolymer of claim 9 wherein the siloxane unit (1) is $H_2NCH_2CH_2NHCH_2CH(CH_3)CH_2SiO_{3/2}$ and the siloxane unit (2) is $$HOOC(CH_2)_3\underset{\underset{CH_3}{|}}{Si}O$$

15. An aqueous solution of a copolymer consisting essentially of the siloxane units $$H_2NCH_2CH_2NH(CH_2)_3SiO_{3/2}$$

and $$HOOCCH(CH_3)CH_2\underset{\underset{CH_3}{|}}{Si}O$$

the relative number of the two units being such that there is at least one amino nitrogen atom for each carboxyl group.

16. An aqueous solution of a copolymer consisting essentialy of the siloxane units $$H_2NCH_2CH_2NHCH_2CH(CH_3)CH_2SiO_{3/2}$$

and $$HOOCCH(CH_3)CH_2\underset{\underset{CH_3}{|}}{Si}O$$

the relative number of the two units being such that there is at least one amino nitrogen atom for each carboxyl group.

17. An aqueous solution of a copolymer consisting essentially of the siloxane units $$H_2NCH_2CH_2NH(CH_2)_3SiO_{3/2}$$

and $$HOOC(CH_2)_3\underset{\underset{CH_3}{|}}{Si}O$$

the relative number of the two units being such that there is at least one amino nitrogen atom for each carboxyl group.

18. An aqueous solution of a copolymer consisting essentially of the siloxane units $$H_2NCH_2CH_2NHCH_2CH(CH_3)CH_2SiO_{3/2}$$

and $$HOOC(CH_2)_3\underset{\underset{CH_3}{|}}{Si}O$$

the relative number of the two units being such that there is at least one amino nitrogen atom for each carboxyl group.

19. An aqueous solution of the copolymer of claim 10, the relative number of the units (1) and (2) being such that there is at least one amino nitrogen atom for each carboxyl group.

20. An aqueous solution of the copolymer of claim 11, the relative number of the units (1) and (2) being such that there is at least one amino nitrogen atom for each carboxyl group.

(References on following page)

References Cited

UNITED STATES PATENTS

| | | | |
|---|---|---|---|
| 2,723,987 | 11/1955 | Speier | 260—448.2 |
| 2,762,823 | 9/1956 | Speier | 260—448.2 |
| 3,033,815 | 5/1962 | Pike et al. | 260—448.2 |
| 3,170,891 | 2/1965 | Speier | 260—448.2 |
| 3,234,252 | 2/1966 | Pater | 260—448.2 |

TOBIAS E. LEVOW, *Primary Examiner.*

HELEN M. McCARTHY, *Examiner.*

J. G. LEVITT, P. F. SHAVER, *Assistant Examiners.*